(12) United States Patent
Bai et al.

(10) Patent No.: US 7,479,333 B2
(45) Date of Patent: Jan. 20, 2009

(54) FUEL CELL STACK WITH MULTIPLE GROUPS OF CELLS AND FLOW PASSES

(75) Inventors: Dingrong Bai, Dorval (CA); Jean-Guy Chouinard, Ville St-Laurent (CA); David Elkaim, Saint-Laurent (CA)

(73) Assignee: Hyteon, Inc., Laval, Québec (CA)

( * ) Notice: Subject to any disclaimer, the term of this patent is extended or adjusted under 35 U.S.C. 154(b) by 704 days.

(21) Appl. No.: 11/009,522

(22) Filed: Dec. 13, 2004

(65) Prior Publication Data

US 2006/0127709 A1 Jun. 15, 2006

(51) Int. Cl.
*H01M 8/04* (2006.01)
*H01M 8/24* (2006.01)

(52) U.S. Cl. ............... 429/13; 429/32; 429/38
(58) Field of Classification Search ............. None
See application file for complete search history.

(56) References Cited

U.S. PATENT DOCUMENTS

| | | | |
|---|---|---|---|
| 3,881,956 A | 5/1975 | Williams | |
| 4,310,605 A | 1/1982 | Early et al. | |
| 4,508,793 A | 4/1985 | Kumata et al. | |
| 4,732,822 A | 3/1988 | Wright et al. | |
| 4,769,297 A | 9/1988 | Reiser et al. | |
| 4,826,742 A | 5/1989 | Reiser | |
| 4,933,242 A | 6/1990 | Koga et al. | |
| 4,988,583 A | 1/1991 | Watkins et al. | |
| 5,108,849 A | 4/1992 | Watkins et al. | |
| 5,300,370 A | 4/1994 | Washington et al. | |
| 5,382,478 A | 1/1995 | Chow et al. | |
| 5,478,662 A | 12/1995 | Strasser | |
| 5,521,018 A | 5/1996 | Wilkinson et al. | |
| 5,527,363 A | 6/1996 | Wilkinson et al. | |
| 5,547,777 A | 8/1996 | Richards | |
| 5,686,199 A | 11/1997 | Cavalca et al. | |
| 5,840,438 A | 11/1998 | Johnson | |
| RE36,148 E | 3/1999 | Strasser | |
| 5,945,232 A | 8/1999 | Ernst et al. | |
| 6,017,648 A | 1/2000 | Jones | |

(Continued)

FOREIGN PATENT DOCUMENTS

EP 0967 675 12/1999

(Continued)

OTHER PUBLICATIONS

Hirata et al. Journal of Power Sources vol. 83, pp. 41-49 1999.

(Continued)

*Primary Examiner*—Jonathan Crepeau
(74) *Attorney, Agent, or Firm*—Ogilvy Renault, LLP (57) ABSTRACT

There is described a method of flowing reactants through a fuel cell stack having a plurality of fuel cells, the method comprising: dividing the stack into a plurality of groups, each of the groups connected together electrically in series; selecting a number of the groups and a number of cells in each of the groups to maintain a substantially constant stoichiometry for each of the groups, wherein a number of the fuel cells in each of said groups is decreasing from upstream to downstream; and distributing the reactants in series to each of the groups and in parallel within each of the groups.

8 Claims, 6 Drawing Sheets

U.S. PATENT DOCUMENTS

| | | | |
|---|---|---|---|
| 6,037,072 | A | 3/2000 | Wilson et al. |
| 6,048,633 | A | 4/2000 | Fujii et al. |
| 6,066,409 | A | 5/2000 | Ronne et al. |
| 6,099,984 | A | 8/2000 | Rock |
| 6,124,051 | A | 9/2000 | Johnson |
| 6,150,049 | A | 11/2000 | Nelson |
| 6,180,273 | B1 | 1/2001 | Okamoto |
| 6,207,310 | B1 | 3/2001 | Wilson et al. |
| 6,251,534 | B1 | 6/2001 | McElroy |
| 6,309,773 | B1 | 10/2001 | Rock |
| 6,403,249 | B1 | 6/2002 | Reid |
| 6,416,895 | B1 | 7/2002 | Voss et al. |
| 6,500,579 | B1 | 12/2002 | Maeda et al. |
| 6,528,196 | B1 | 3/2003 | Fujii et al. |
| 6,534,209 | B1 | 3/2003 | Hauer |
| 6,602,625 | B1 | 8/2003 | Chen et al. |
| 6,605,378 | B2 | 8/2003 | Saito et al. |
| 6,649,293 | B1 | 11/2003 | Jones |
| 6,684,948 | B1 | 2/2004 | Savage |
| 6,686,080 | B2 | 2/2004 | Farkash et al. |
| 6,686,082 | B2 | 2/2004 | Leger |
| 6,692,859 | B2 | 2/2004 | Mukerjee et al. |
| 6,794,068 | B2 * | 9/2004 | Rapaport et al. .............. 429/13 |
| 6,821,668 | B1 | 11/2004 | Perry et al. |
| 2001/0001052 | A1 | 5/2001 | Bonk |
| 2001/0021470 | A1 | 9/2001 | May et al. |
| 2001/0049046 | A1 | 12/2001 | Butler |
| 2002/0045075 | A1 | 4/2002 | Pinto et al. |
| 2002/0081474 | A1 | 6/2002 | Foster |
| 2002/0106548 | A1 | 8/2002 | Chung et al. |
| 2002/0110723 | A1 | 8/2002 | Farkash |
| 2002/0168560 | A1 | 11/2002 | Mukerjee et al. |
| 2002/0187374 | A1 | 12/2002 | Yamauchi et al. |
| 2002/0192531 | A1 | 12/2002 | Zimmerman et al. |
| 2003/0003345 | A1 | 1/2003 | Ohara et al. |
| 2003/0039875 | A1 | 2/2003 | Horiguchi et al. |
| 2003/0039876 | A1 | 2/2003 | Knights et al. |
| 2003/0059662 | A1 | 3/2003 | Debe et al. |
| 2003/0072986 | A1 | 4/2003 | Kusakabe et al. |
| 2003/0099873 | A1 | 5/2003 | Brambilla et al. |
| 2003/0104265 | A1 | 6/2003 | Yoshimoto et al. |
| 2003/0118878 | A1 | 6/2003 | Pinto |
| 2003/0138688 | A1 | 7/2003 | Hattori et al. |
| 2003/0148157 | A1 | 8/2003 | Grasso et al. |
| 2003/0152819 | A1 | 8/2003 | Hatoh et al. |
| 2003/0170526 | A1 | 9/2003 | Hodgson et al. |
| 2003/0180603 | A1 | 9/2003 | Richards |
| 2003/0186106 | A1 | 10/2003 | Frank et al. |
| 2003/0198839 | A1 | 10/2003 | Bruck et al. |
| 2003/0211376 | A1 | 11/2003 | Hatoh |
| 2003/0219635 | A1 | 11/2003 | Lee et al. |
| 2003/0219643 | A1 | 11/2003 | Yang et al. |
| 2004/0018412 | A1 | 1/2004 | Orsbon et al. |
| 2004/0023100 | A1 | 2/2004 | Boff |
| 2005/0271909 | A1 | 12/2005 | Bai et al. |
| 2005/0271910 | A1 | 12/2005 | Bai et al. |

FOREIGN PATENT DOCUMENTS

| | | |
|---|---|---|
| EP | 1286408 | 2/2003 |
| JP | 6267564 | 9/1994 |
| JP | 7-22048 | 1/1995 |
| WO | WO 01/48843 A2 | 7/2001 |
| WO | WO 02/069426 A2 | 9/2002 |
| WO | WO 02/093668 A1 | 11/2002 |
| WO | WO 02/093672 A2 | 11/2002 |
| WO | WO 03/026049 | 3/2003 |

OTHER PUBLICATIONS

Wang et al. Journal of Power Sources vol. 94, pp. 40-50 2001.
Naseri-Neshat et al. http:www.utc.scsu.edu/effects.htm last visited Aug. 5, 2003.
Li et al. Journal of Power Sources, vol. 115, pp. 90-100 2003.
Yoon et al. Journal of Power Sources vol. 118, pp. 193-199 2003.

* cited by examiner

Fig. 6

# FUEL CELL STACK WITH MULTIPLE GROUPS OF CELLS AND FLOW PASSES

CROSS-REFERENCE TO RELATED APPLICATIONS

This application is the first filed application for the present invention.

TECHNICAL FIELD

The present invention relates to devices which produce an electrical current by means of a chemical reaction or change in physical state, and more specifically, sub-combinations of the device and the process of operating the same.

BACKGROUND OF THE INVENTION

A fuel cell is an electrochemical device that converts fuel and oxidant directly into electricity and a reaction by-product of water through an electrolytic reaction that strips hydrogen molecules of their electrons and protons. Ultimately, the stripped electrons are collected into some form of usable electric current, by resistance or by some other suitable means. The protons react with oxygen to form water as a reaction by-product.

Typically, a single Proton Exchange Membrane (PEM) fuel cell, operating at a temperature of around 70-80° C., consists of a combined solid polymer membrane electrolyte and two thin layers of catalysts on each side of the electrolyte, commonly called a membrane electrode assembly (MEA), which is sandwiched between two electrically conductive flow field plates (or separator plates). Generally, a single cell produces about 0.6-0.8 volt. In order to generate a higher voltage to meet practical power demands, multiple cells are commonly stacked in series to form a structure known as a fuel cell stack.

Figure 1:
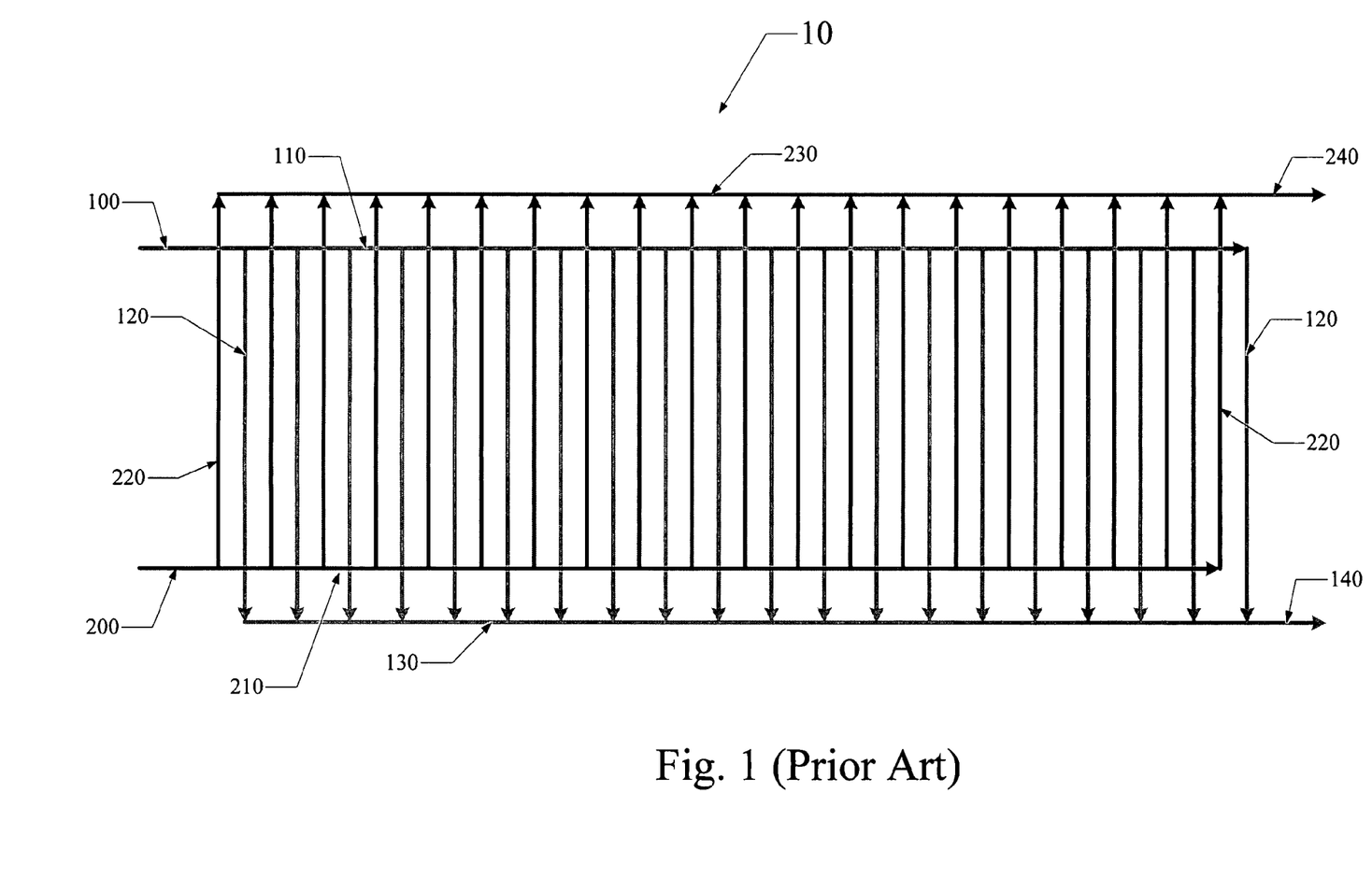
FIG. 1 is a schematic representation of the prior art fuel cell stack, which receives a fuel and an oxidant and distributes them into each individual cell in the stack.

As schematically illustrated in FIG. 1, a fuel cell stack 10 is formed by compressively stacking multiple fuel cells between two endplates. Gas reactants, hydrogen or hydrogen-rich fuel 100 and oxygen or oxygen-containing air 200, are directed into the fuel cell stack through gas manifolds 110 and 210 and distributed into the anode side 120 and the cathode side 220 of individual cells. The depleted reactants are collected into the outlet manifolds 130 and 230 and then flow out the stack as indicated by streams 140 and 240. Although not shown, there may be flow passages for flowing stack coolant.

Operation of such conventional fuel cell stacks is well known for those familiar with the art, and it is well known that the performance of such conventional fuel cell stacks depends on various factors. Among many others are the flow distribution, stoichiometry, and by-product water removal from the cells. Firstly, it has been well documented in the field that the performance of a fuel cell stack having a plurality of cells is generally lower than the performance of a single cell. The decline in the performance, which is more severe for the cells located at either ends or at both ends of the stack, is believed to be due, at least in part, to the fact that reactant distribution into individual cells of a stack becomes non-uniform. The non-uniformity in reactant gas distribution becomes more pronounced for a longer stack with a larger number of cells than a short stack with a smaller number of cells. Use of longer stacks formed by multiple cells, in most cases, is usually necessary because of the requirement for meeting the power output demand.

The stoichiometry, which is defined as the ratio of the amount of the reactant gas supplied into the stack to the amount of the reactant gas consumed in the stack, is an important operation parameter as it is the inverse of the reactant gas utilization and hence directly affects the fuel cell system efficiency. In practice, the stoichiometry has an impact on limiting current density because it directly affects the mass transfer from the bulk gas channels to the interface of catalysts. More importantly, the stoichiometry plays a significant role in water management, more specifically, the water removal from the cell where it is produced. A higher stoichiometry, usually as high as 1.5 for fuel side, and 3 to 4 for air side, will enhance the mass transfer and water removal. The practice of applying high stoichiometry is particularly common and important for the cathode air as, firstly, the cathode activation is low, and secondly, the water is produced and accumulated along the cathode flow field. Operation of a fuel cell stack with high air stoichiometry, on the other hand, has been one of the biggest parasitic power consumptions due to cathode air compression and delivery.

Therefore, there is a need to reduce stoichiometry of fuel cell stacks without reducing the performance of the stack.

SUMMARY OF THE INVENTION

It is an object of the present invention to provide a method and a fuel cell stack that is an improvement over the prior art.

In accordance with a first broad aspect of the present invention, there is provided a method of flowing reactants through a fuel cell stack having a plurality of fuel cells, the method comprising: dividing the stack into a plurality of groups, each of the groups connected together electrically in series; selecting a number of the groups and a number of cells in each of the groups to maintain a substantially constant stoichiometry for each of the groups, wherein the number of the fuel cells in each of said groups is decreasing from upstream to downstream; and distributing the reactants in series to each of the groups and in parallel within each of the groups.

In accordance with a second broad aspect of the present invention, there is provided a fuel cell stack comprising a plurality of sub-divided groups connected together electrically in series, each of the groups having a number of fuel cells connected together electrically in series, wherein the number of fuel cells in each of the groups is decreasing from upstream to downstream, and reactants are distributed in series to each of the groups and in parallel within each of the groups, and the number of the groups and the number of cells in each of the groups is selected to maintain a substantially constant stoichiometry for each of the groups.

It should be understood that while the stoichiometry is substantially constant, it will vary slightly in order to have integer numbers for the number of cells in each group.

Preferably, the formula used to determine the number of groups and the number of cells in each group is the following:

$$\lambda_n = \frac{\lambda N - \sum_{i=1}^{N_{n-1}} N_i}{N_n}.$$

Other formulae may be derived to obtain the same result, which is the constant stoichiometry within each group of the stack, while maintaining a lower overall stoichiomery.

The present invention improves the uniformity of reactant gas distribution into individual cells. This can be achieved by using conventional fuel cell stack designs and manufacturing, and therefore without significant cost addition.

The present invention also provides a fuel cell stack that improves the capability and performance of water removal. This is achieved without increasing the reactant gas, especially cathode air, stoichiometry.

The present invention provides a fuel cell stack that improves the fuel cell performance. The performance improvement can be achieved with local, but not overall, increased reactant gas stoichiometry, which improves both mass transfer and water removal.

The present invention also provides a fuel cell stack that allows using lower reactant stoichiometry, especially cathode air, but without lowering this parameter for any single cell. The operation of lower overall stoichiometry will reduce the parasitic power consumption associated with the reactant gas (particularly cathode air) compression and delivery, and thus increase the fuel cell system efficiency. The increased in-cell stoichiometry, under circumstances of lower overall stoichiometry, will increase the cell performance due to improvement in mass transfer and water removal.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

In a preferred fuel cell stack according to the present invention, there are a plurality of fuel cells which may each comprise a cathode flow field plate, an anode flow field plate and a membrane electrode assembly (MEA) sandwiched between the above mentioned two flow field plates. They are compressively stacked together to form a stack assembly. On each plate there are holes for distributing and discharging reactant gases and coolant in a preferred manner, and these holes form gas or coolant manifolds when the cells are stacked together. These multiple cells are located in between two end plates, which may be tightly connected by several tie rods or the like. There may be current collectors located at the two ends of the stack assembly to make a current circuit, and there may also be insulation material between the end cell and the endplate. All these stack components and structure should be well understood by those familiar with the art.

As briefly described above in conjunction with FIG. 1, the prior art fuel cell stack have multiple fuel cells that receive the reactant gases through inlets normally on the endplates, and distribute them into individual cells in the stack through flow-through manifolds. The depleted reactant gases are collected and discharged out of the stack also by flow-through manifolds. As already pointed out, such conventional fuel cell stacks suffer several drawbacks including difficulty to achieve uniform reactant distribution into each cell in the stack, poor water removal performance and the necessity of operation with high stoichiometry. Consequently, the conventional fuel cell stacks, especially the longer ones, have reduced performance and lifetime.

Figure 2:
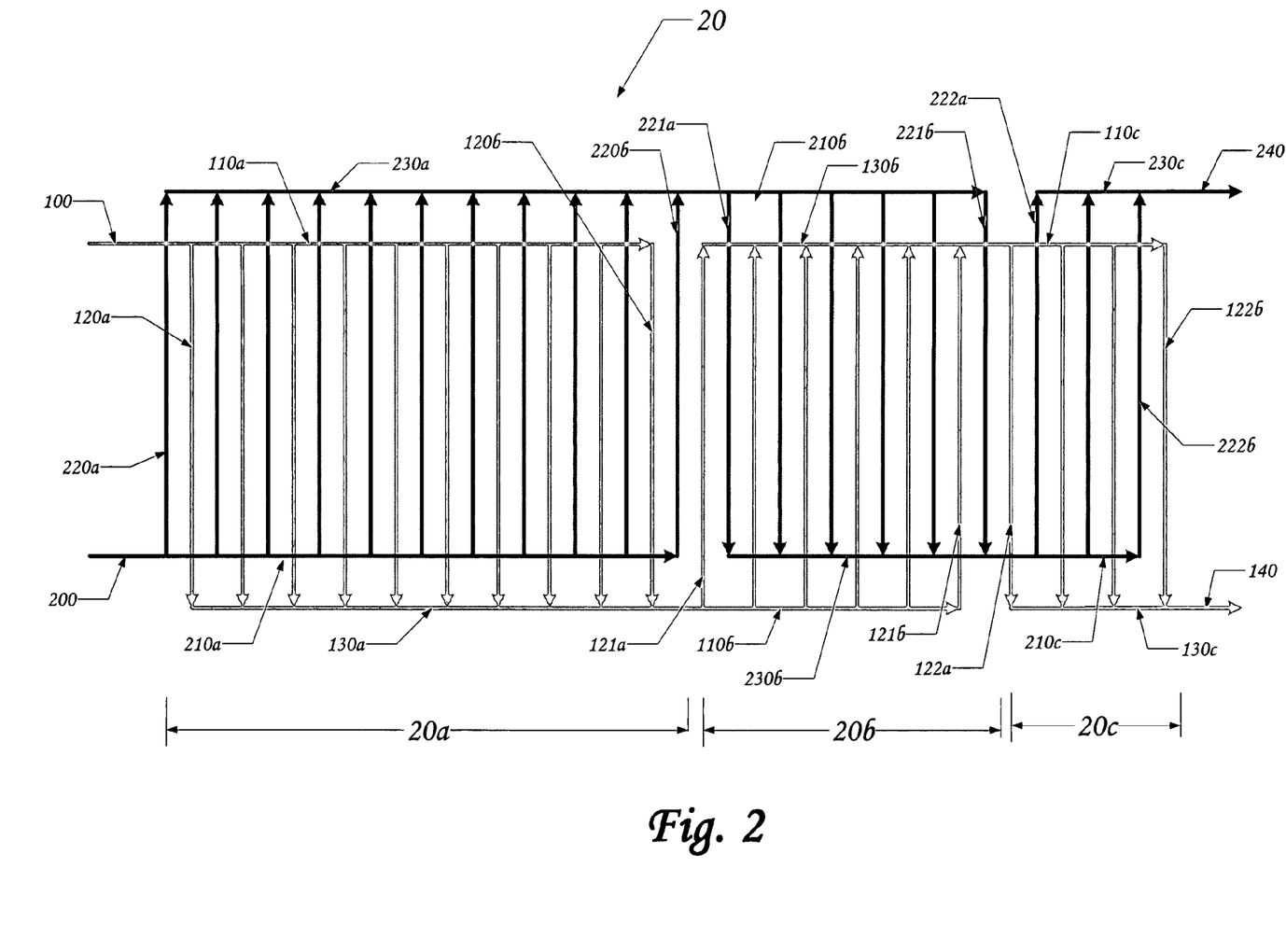
FIG. 2 is a schematic illustration of the fuel cell stack according to an embodiment of the present invention, which comprises three groups of cells and flow passages.

Now referring to FIG. 2 for the details of the present invention, where a fuel cell stack assembly 20 is schematically illustrated only for understanding the reactant flow passages. Supplied to the stack 20 are hydrogen or hydrogen-rich fuel stream 100 and oxygen or air stream 200. The fuel cell stack 20 is divided into a preferred number of sections or sub-stacks, 20a, 20b, 20c and so on. The number of sections is generally between 2 to 10, and preferably 3 to 5.

The reactant flow passages are now to be described by focusing on air stream 200, noting the similar flow arrangement and passages for the hydrogen stream 100. The air stream 200 enters first into the gas manifold 210a of the first stack section 20a, and then is distributed into individual cells 220a to 220b. The cathode air exiting the cells of stack section 20a is collected into the manifold 230a and is directed into the next stack section 20b. In the section 20b, the cathode air is redistributed into individual cells 221a to 221b through the manifold 210b. The cathode air, passing the flow fields of the cells of stack section 20b, is again collected in the manifold 230b, which is connected with the manifold 210c, from where it is directed into individual cells 222a to 222b of the stack section 20c. The depleted cathode air 240 is eventually exhausted from the outlet manifold 230c of the stack section 20c.

It is worthwhile to note that, as illustrated in FIG. 2, the number of cells in each stack section is decreasing from upstream to downstream, i.e. the number of cells in the section 20a is greater than the number of cells in the section 20b, which is then greater than the number of cells in the section 20c. The reduction in the number of cells from one section to the next is preferred to compensate the reduction in gas flow rate and/or reactant molecules due to their consumption from electrochemical reaction having taken place in the section. The reduction in the number of cells from one section to the other would allow the gas flow rate to be maintained at a preferably constant value or even become higher in the next section. This involves considerations, firstly, to maintain a higher gas flow rate to enhance mass transfer because higher gas velocity increases reactant molecules convective mass transport though porous gas diffusion media and catalyst layers, and to enhance water removal because the water is gradually produced and accumulated along the way toward downstream sections, and secondly, to improve the catalyst utilization by flowing same or similar reactant molecules over unit area of catalysts for all the sections. The former is because an increased gas flow rate would be needed to push and carry the water out of the flow field, while the locally increased gas flow rate would reduce the dew point of water and therefore stimulate water vaporization and prevent water from condensation, which is known as a cause of water flooding over the electrode catalysts of the cells. The reduction in the number of cells, i.e. the active catalytic area, leads to same or similar reactant molecules per active catalytic area as the reactant molecules deplete towards downstream. As a result of these two effects, i.e. improved water removal and catalysts utilization, the fuel cell stack performance is improved.

The reduction rate in the number of cells can be determined in practice by a number of factors such as total power output, stack dimensions and cost. It is generally recommended, but not limited to, the reduction rate in the number of cells follows the reactant gas consumption rate or the reactant molecules consumption rate, which inversely correspond to the gas or reactant molecules utilization rates. In such a manner, a nearly constant gas flow rate or reactant molecules can be attained over the entire stack, from its first to last sections. The reduction in the number of cells can also follow the method to be described in detail below in order to maintain a higher and constant local reactant stoichiometry.

The division of the stack into several sections according to the present invention will also lead to improved uniformity in reactant gas distribution in individual cells in the stack as the stack sections are shorter.

The fuel cell stack according to the present invention will allow a significant reduction of the reactant stoichiometry, particularly the cathode air. As mentioned earlier, the prior art fuel cell stacks must be operated with an air stoichiometry of as high as 3 to 4 or even higher in order to enhance oxygen transfer and remove water, and thus achieve better cell performance. As a result, the prior art fuel cell systems usually require a cathode air blower or compressor to deliver the required large air supply rate, which has been responsible for a significant portion of the parasitic power consumption. The parasitic power consumption for the air blower or compressor becomes more pronounced when considering the increased pressure drop losses when the large air flow rate flows through air filters, stacks, and conduits. An air blower or compressor with a large capacity certainly costs more than a smaller one.

It is therefore highly desirable to reduce the air stoichiometry or air supply rate while it is still possible to maintain or even enhance the water removal capability and cell performance. The fuel cell stack according to the present invention has actually provided a solution for this problem. As illustrated in FIG. 2, the reactant gas is successively supplied into groups of cells having smaller number of cells than the entire stack, and therefore the gas flow rate in each group of cells is increased if the total air supply rate remains the same. This makes it possible to supply an air flow rate that is noticeably lower than it would have been for a prior art fuel cell stack, to achieve the same air flow rate and oxygen stoichiometry in each group of cells. More specifically, the fuel cell stack according to the present invention is able to allow for an increased in-cell stoichiometry, under circumstances of lower overall stoichiometry, which consequently will increase the cell performance due to improvement in mass transfer and water removal as well as reduction in parasitic power consumption associated with air compression and delivery.

The above advantage can be further demonstrated by an example as illustrated below. Assume a 100-cell stack operating with an air stoichiometry of 1.5, which is actually impractical with the prior art fuel cell stacks. The fuel cell stack is divided into three sections with the number of cells being 50, 30 and 20 for each group respectively. In a unit basis, a 100-cell stack with an air stoichiometry of 1.5 would be supplied 150 units of oxygen, or 714 units of air. For the 100-cell prior art fuel cell stack, for each cell this translates to an air supply rate of 7.1 units and an outlet rate of 6.1 units (in dry air basis). However, with the same overall air stoichiometry of 1.5, it will turn out to be an air stoichiometry as high as 3.0 to 3.5 for the fuel cell stack according to the present invention. The calculated results have been listed in the following table (Table 1). From Table 1, it becomes clear that the fuel cell stack according to the present invention with an overall air stoichiometry of 1.5 would perform better than, or at least equivalent to, the prior fuel cell stack that would have used an air stoichiometry of 3.0, which will certainly double the parasitic power consumption than the fuel cell stack of the present invention.

TABLE 1

| Group | Cell number | $O_2$ into the cell | $O_2$ out the cell | Air into the cell | Air out the cell |
|---|---|---|---|---|---|
| Fuel Cell Stack of Present Invention | | | | | |
| A | 1-50 | 3.0 | 2.0 | 14.3 | 13.3 |
| B | 51-80 | 3.3 | 2.3 | 22.1 | 21.1 |
| C | 81-100 | 3.5 | 2.5 | 31.7 | 30.7 |
| Overall | $O_2$ stoichiometry: 1.5; Air supply: 714; Air exhaust: 614. | | | | |
| Prior Art Fuel Cell Stack | | | | | |
| | 1-100 | 1.5 | 0.5 | 7.1 | 6.1 |
| Overall | $O_2$ stoichiometry: 1.5; Air supply: 714; Air exhaust: 614. | | | | |

Table 2 further compares the results between the fuel cell stack of the present invention operating with an air stoichiometry of 1.5 and the prior art fuel cell stack operating with an air stoichiometry of 3.0. It is noted that with twice the air stoichiometry, the prior art fuel cell stack will be expected to perform poorly in terms of water removal, especially for the cells in groups B and C because the air flow rate and air stoichiometry in these cells are greater in the fuel cell stack of the present invention than the prior art fuel cell stack.

TABLE 2

| Group | Cell number | $O_2$ into the cell | $O_2$ out the cell | Air into the cell | Air out the cell |
|---|---|---|---|---|---|
| Fuel Cell Stack of Present Invention | | | | | |
| A | 1-50 | 3.0 | 2.0 | 14.3 | 13.3 |
| B | 51-80 | 3.3 | 2.3 | 22.1 | 21.1 |
| C | 81-100 | 3.5 | 2.5 | 31.7 | 30.7 |
| Overall | O2 stoichiometry: 1.5; Air supply: 714; Air exhaust: 614. | | | | |
| Prior Art Fuel Cell Stack | | | | | |
| | 1-100 | 3.0 | 2.0 | 14.3 | 13.3 |
| Overall | $O_2$ stoichiometry: 3.0; Air supply: 1429; Air exhaust: 1329. | | | | |

It is therefore advantageous that the fuel cell stack according to the present invention will not only improve the cell performance by enhancing water removal and mass transfer, but also significantly reduce the parasitic power consumption by being able to operate at a significantly low overall air stoichiometry while attaining a high in-cell air stoichiometry. Although Tables 1 and 2 compare the fuel cell stacks between the prior art and the present invention based on the assumption of same stack size, it will be understood that a smaller size stack according to the present invention could be used for the same power output.

Figure 3A:
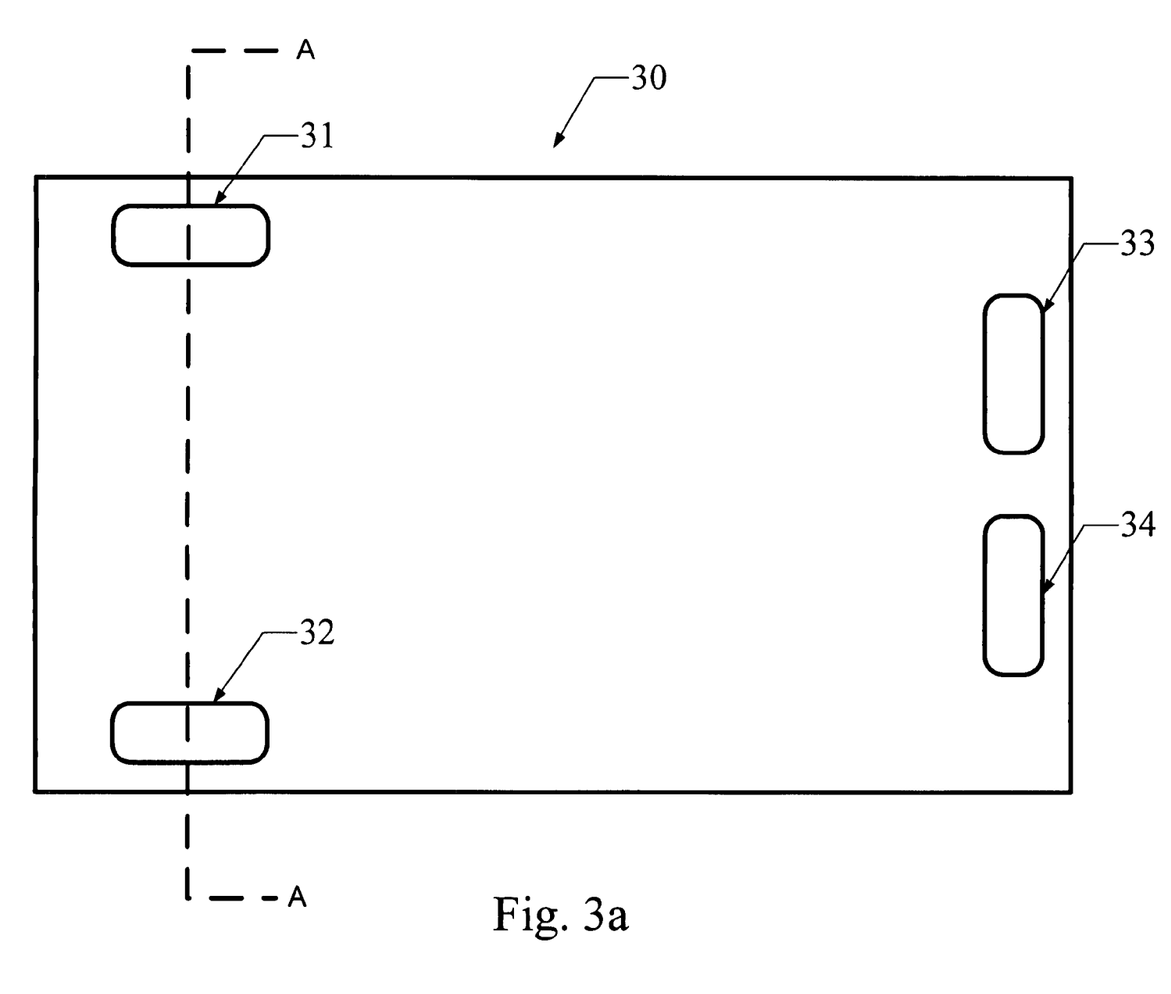
FIG. 3a shows an embodiment of the plate separating the adjacent groups of cells.
Figure 3B:
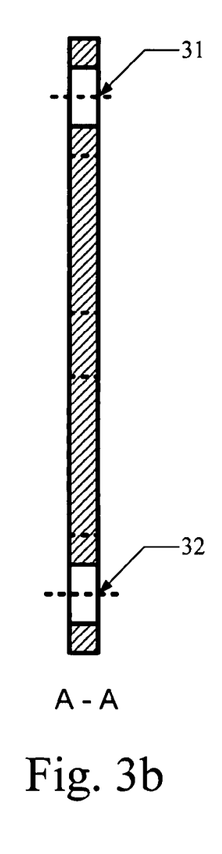
FIG. 3b is a cross-sectional view of FIG. 3a along lines A-A.

The fuel cell stack according to the present invention can be readily manufactured and assembled without noticeable addition of material and cost compared to the prior art fuel cell stack. It can actually be retrofitted from the prior art fuel cell stack, for example by inserting a separating plate between adjacent sections. On such a separating plate 30, as schematically shown in FIG. 3, there are only open holes for the fluids in communication between the adjacent sections, such as hole 31 for hydrogen fuel, hole 32 for air, and holes 33 and 34 for coolant. The other streams such as holes forming inlet manifolds for this section will not be made on this separating plate.

Figure 4A:
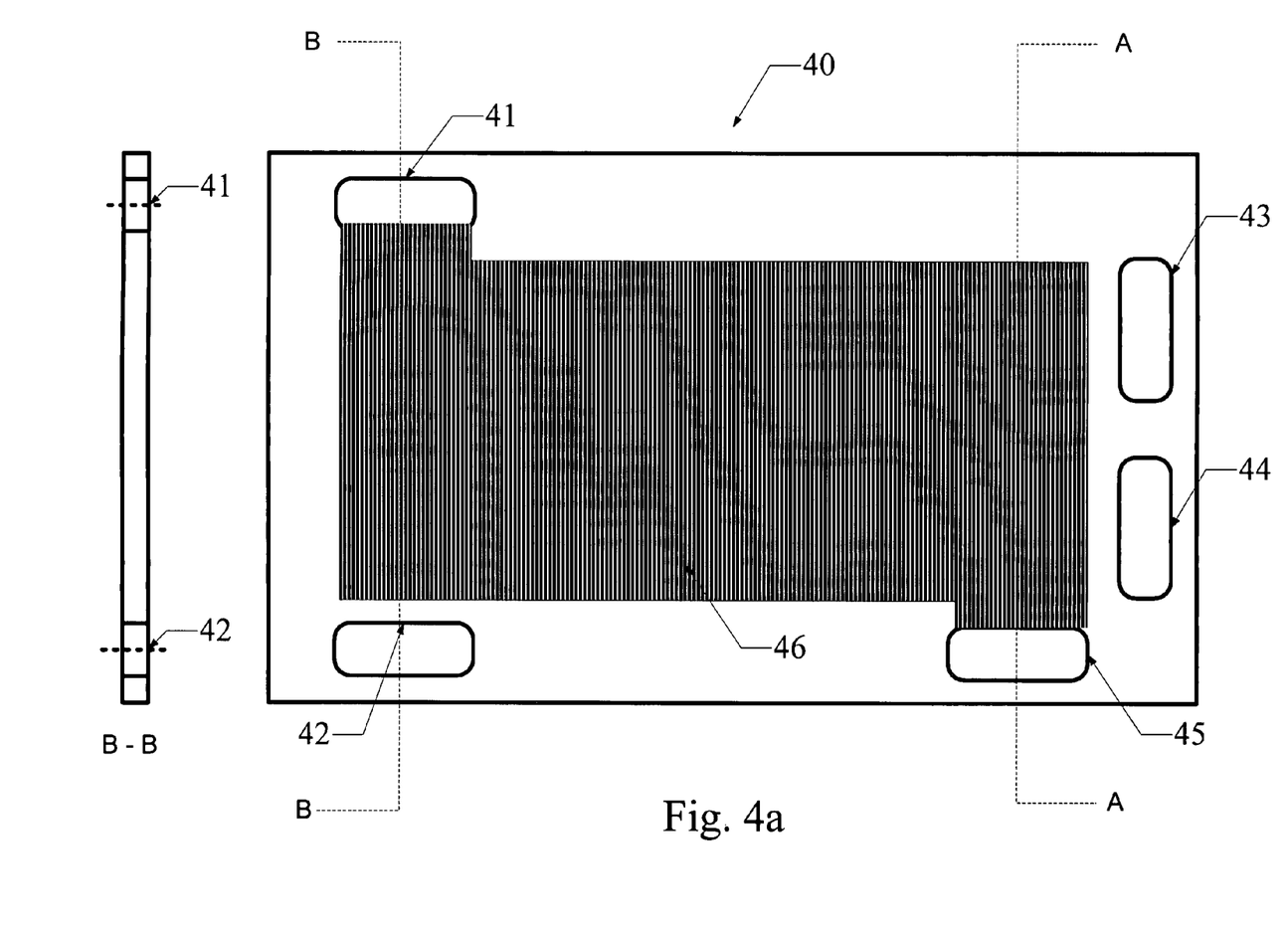
FIG. 4a is an alternative for the plate of FIG. 3, with an electrochemically active catalyst surface on the plate.
Figure 4B:
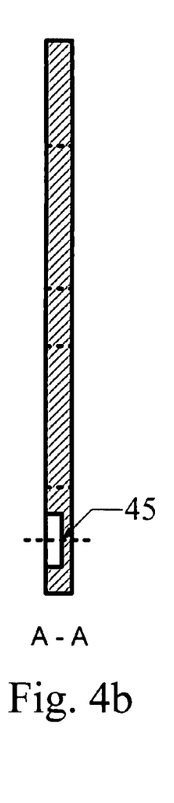
FIG. 4b is a cross-sectional view of FIG. 4a along lines A-A.

Division of the adjacent sections of the fuel cell stack according to the present invention can also be accomplished by applying a slightly different flow field plate, such as one schematically shown in FIG. 4. On this flow field plate 40, which could be used as 120b, 121a, 122b, 122a, 220b, 221a, and 222a in FIG. 2, there is a flow field 46 with grooved channels of any kind, which is fluidly communicating with an inlet half-depth hole 45 to receive the reactant stream. The depleted reactant stream exits the flow field into an outlet hole 41, which is a flow-through hole for directing the stream into the next section of the stack. The other reactant stream, flowing over the flow field plate preceding this plate 40 (not shown), will be directed to the next section of the stack through flow-through hole 42. The holes 43 and 44 are used for flowing of coolant.

The following is a method for determining the number of groups and the number of cells in each group.

Define:

N: total number of cells of a fuel cell stack
I: total current flowing through the fuel cell stack
$\lambda$: overall stoichiometry of reactant $H_2$ or $O_2$
n: total number of cell groups
$N_i$: number of cells in cell group i (i=1, 2, ..., n)
$\lambda_i$: stoichiometry of reactant $H_2$ or $O_2$ in cell group i (i=1, 2, ..., n)

For fuel cell reactions:
Anode: $H_2 \rightarrow 2H^+ + 2\ e^-$
Cathode: $O_2 + 4H^+ + 4\ e^- \rightarrow H_2O + heat + electricity$.

The hydrogen and oxygen consumptions to produce a current, I, are determined as I/2F and I/4F (F is Farad constant), respectively. Therefore, the total reactant supply rate to a stack having N cells can be expressed by:

$$\text{total reactant supply rate} = \lambda \frac{1}{mF} N \quad (m = 2 \text{ for } H_2 \text{ and } 4 \text{ for } O_2) \tag{1}$$

If this fuel cell stack is divided into n cell groups and the flow is first introduced into cell group 1, and then successively flows from a previous group to a next group, the stoichiometry of reactant $H_2$ or $O_2$ in cell group i (i=1, 2, ..., n) can be determined as:

$$\lambda_1 = \frac{\lambda \frac{I}{mF} N}{\frac{I}{mF} N_1} = \frac{\lambda N}{N_1} \tag{2}$$

$$\lambda_2 = \frac{\lambda \frac{1}{mF} N - \frac{I}{mF} N_1}{\frac{1}{mF} N_2} = \frac{\lambda N - N_1}{N_2} \tag{3}$$

$$\lambda_3 = \frac{\lambda \frac{1}{mF} N - \frac{I}{mF} N_1 - \frac{I}{mF} N_2}{\frac{1}{mF} N_3} = \frac{\lambda N - N_1 - N_2}{N_3} \tag{4}$$

$$\lambda_n = \frac{\lambda \frac{1}{mF} N - \sum_{i=1}^{N_{n-1}} \frac{I}{mF} N_i}{\frac{1}{mF} N_n} = \frac{\lambda N - \sum_{i=1}^{N_{n-1}} N_i}{N_n} \tag{5}$$

According to the present invention, the Stoichiometry should approximately equal for each cell group, i.e.

$$\lambda_1 = \lambda_2 = \lambda_3 = \ldots = \lambda_n$$

$$N = N_1 + N_2 + N_3 + \ldots + N_n \tag{6}$$

When applying the above method to determine the number of cells for each group, slight roundup or round down or adjustment might be required.

EXAMPLE 1

In this example, $O_2$ utilization is increased from 33% to 67%.
Total number of cells: 100
Overall stoichiometry of reactant $O_2$: 1.5
Design local stoichiometry of reactant $O_2$: 3.0

TABLE 3

|  |  | Local stoichiometry of reactant $O_2$ after cell number adjustment |
|---|---|---|
| Cell Group 1 | 50 | 3 |
| Cell Group 2 | 30 | 3.3 |
| Cell Group 3 | 20 | 3.5 |

EXAMPLE 2

In this example, $O_2$ utilization is increased from 25% to 67%.
Total number of cells: 100
Overall stoichiometry of reactant $O_2$ : 1.5
Design local stoichiometry of reactant $O_2$ : 4.0

TABLE 4

|  |  | Local stoichiometry of reactant $O_2$ after cell number adjustment |
|---|---|---|
| Cell Group 1 | 38 | 3.9 |
| Cell Group 2 | 28 | 4.0 |
| Cell Group 3 | 20 | 4.2 |
| Cell Group 4 | 14 | 4.6 |

EXAMPLE 3

In this example, $O_2$ utilization is increased from 25% to 80%. Table 5 only presents the local $O_2$ stoichiometry for the first four cell groups comprising 87 cells in total.
Total number of cells: 100
Overall stoichiometry of reactant $O_2$: 1.25
Design local stoichiometry of reactant $O_2$ : 4.0

TABLE 5

|  |  | Local stoichiometry of reactant $O_2$ after cell number adjustment |
|---|---|---|
| Cell Group 1 | 31 | 4.0 |
| Cell Group 2 | 24 | 3.9 |
| Cell Group 3 | 18 | 3.9 |
| Cell Group 4 | 14 | 3.7 |

EXAMPLE 4

In this example, $H_2$ utilization is iIncreased from 50% to 95%.
Total number of cells: 100
Overall stoichiometry of reactant $H_2$: 1.05
Design local stoichiometry of reactant $H_2$: 2.0

TABLE 6

|  | | Local stoichiometry of reactant $O_2$ after cell number adjustment |
| --- | --- | --- |
| Cell Group 1 | 52 | 2.0 |
| Cell Group 2 | 26 | 2.0 |
| Cell Group 3 | 13 | 2.1 |
| Cell Group 4 | 6 | 2.3 |
| Cell Group 5 | 3 | 2.7 |

As shown in these example, the division of the anode and cathode such as the number of cell groups and the number of cells in each cell group, unlike U.S. Pat. No. 5,478,662, can be different according to the present invention. Such a difference might be necessary if one need to keep constant local stoichiometry separately for anode and for cathode.

Figure 5:
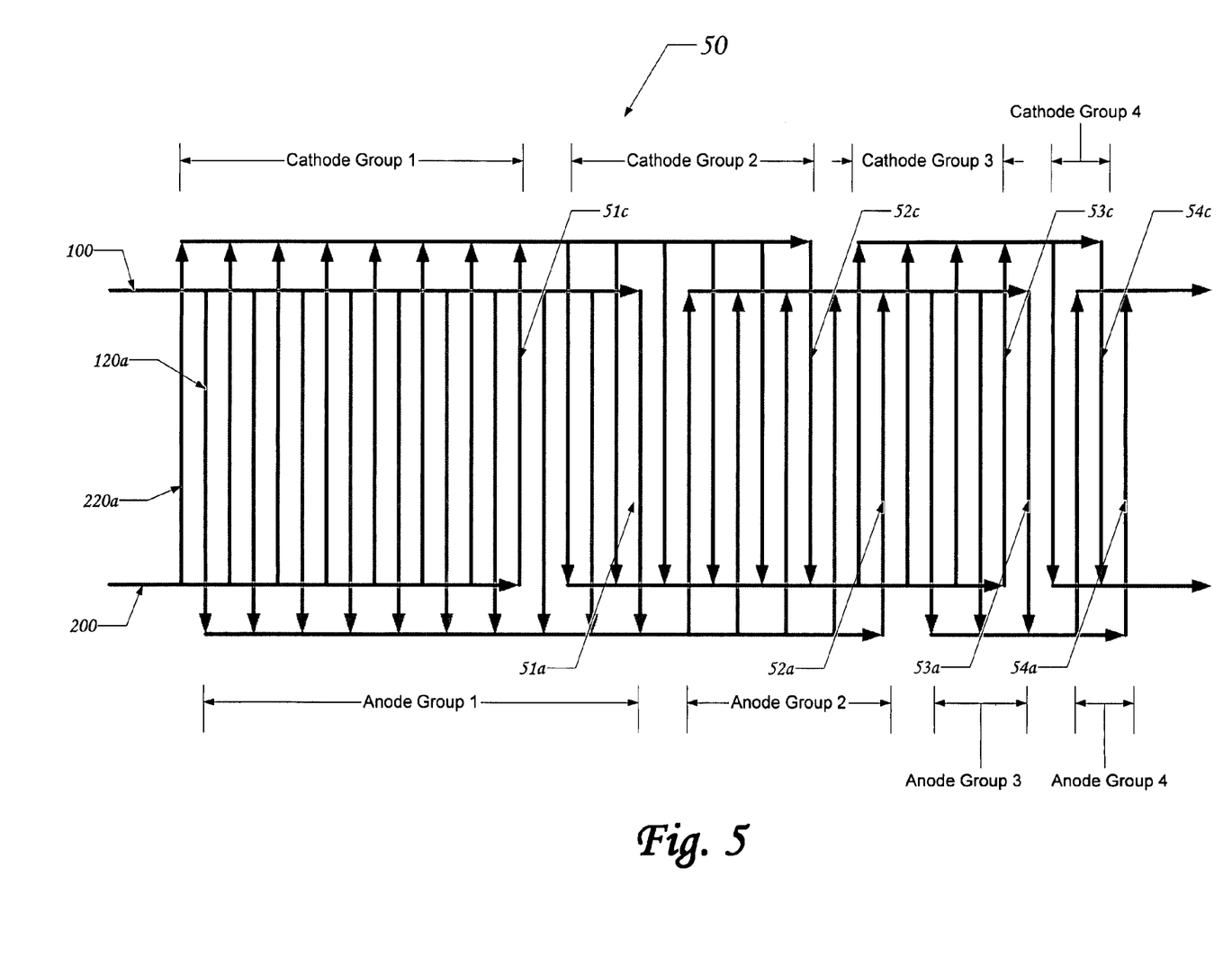
FIG. 5 is a fuel cell stack that has been divided into 4 cell groups for each anode and cathode side.

As illustrated in FIG. 5, there is a provided a fuel cell stack that has been divided into 4 cell groups for each anode and cathode side. Shown here for illustration purpose only, the fuel cell stack has a total 20 cells, and is divided to provide an overall $H_2$ stoichiometry of 1.05 and a local stoichiometry of about 2.0, and overall $O_2$ stoichiometry of 1.25 and a local stoichiometry of about 3.0. According to the method described above, the anode is divided into four groups (51a to 54a), each with 10, 5, 3 and 2 cells. The cathode is also divided into four groups (51c to 54c), each with 8, 6, 4 and 2 cells.

Figure 6:
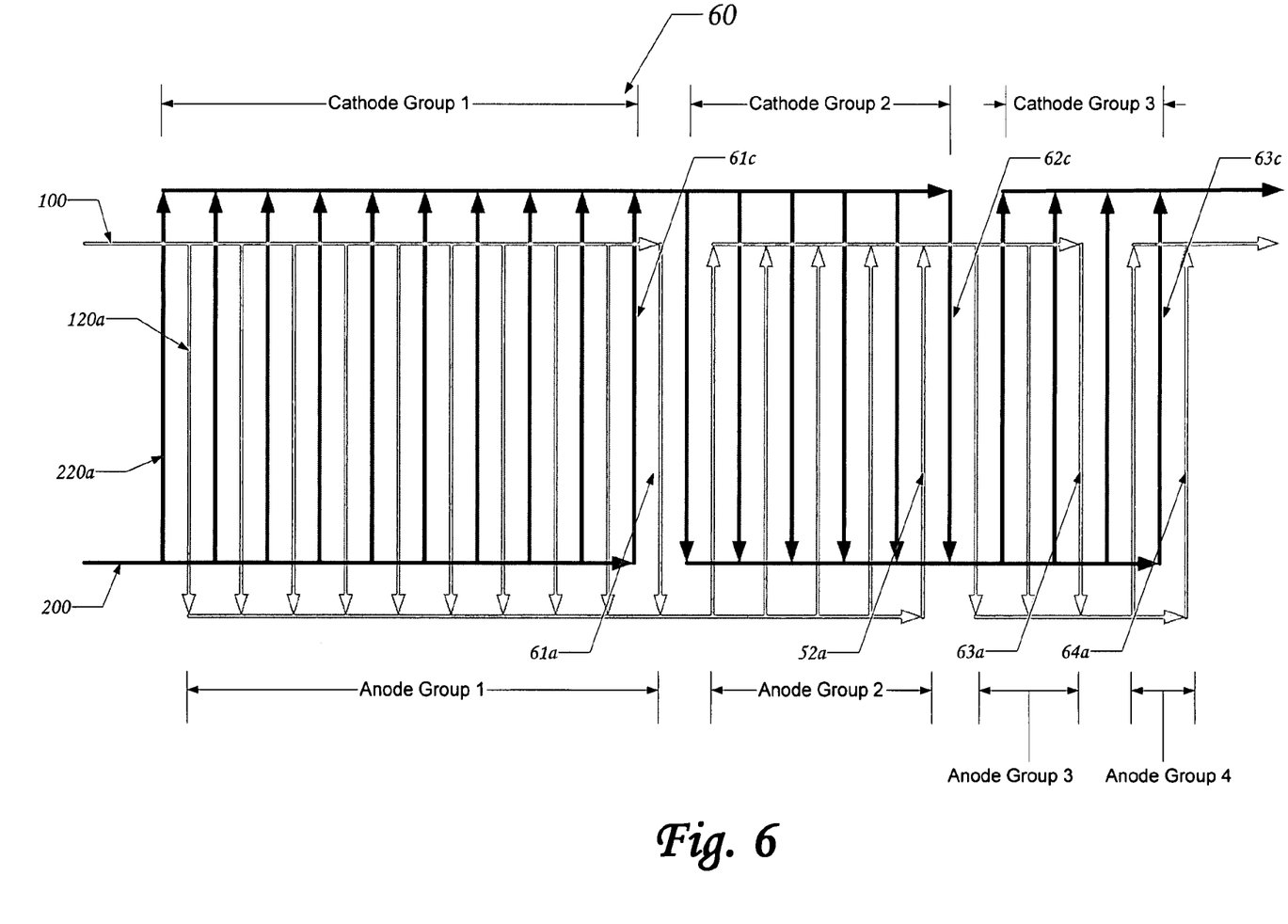
FIG. 6 is a fuel cell stack that has been divided into 4 cell groups for anode side, and three groups for the cathode side.

As illustrated in FIG. 6, there is provided a fuel cell stack that has been divided into 4 cell groups for anode side, and three groups for the cathode side. Shown here for illustration purpose only, the fuel cell stack has a total 20 cells, and is divided to provide an overall $H_2$ stoichiometry of 1.05 and a local stoichiometry of about 2.0, and overall $O_2$ stoichiometry of 1.25 and a local stoichiometry of about 2.5. According to the method described above, the anode is divided into four groups (61a to 64a), each with 10, 5, 3 and 2 cells. The cathode is divided into three groups (61c to 63c), each with 10, 6, and 4 cells.

The embodiments of the invention described above are intended to be exemplary only. The scope of the invention is therefore intended to be limited solely by the scope of the appended claims.

We claim:

1. A method of flowing an anode reactant and a cathode reactant through a fuel cell stack having a plurality of fuel cells, the method comprising:
   dividing said stack into a plurality of first groups for said anode reactant and a plurality of second groups for said cathode reactant, each of said first groups and each of said second groups respectively connected together electrically in series;
   selecting a number of said first groups and a number of fuel cells in each of said first groups to maintain a substantially constant anode reactant stoichiometry for each of said first groups, wherein a number of said fuel cells in each of said first groups is decreasing from upstream to downstream;
   selecting a number of said second groups and a number of fuel cells in each of said second groups to maintain a substantially constant cathode reactant stoichiometry for each of said second groups, wherein a number of said fuel cells in each of said second groups is decreasing from upstream to downstream, at least one of said number of said first groups and said number of said second groups, and said number of fuel cells in each of said first groups and said number of fuel cells in each of said second groups being different; and
   distributing said anode reactant in series to each of said first groups and in parallel within each of said first groups and distributing said cathode reactant in series to each of said second groups and in parallel within each of said second groups.

2. A method as claimed in claim 1, wherein said dividing said stack comprises providing separating plates in between each of said first groups and said second groups, said separating plates having apertures for said anode reactant, for said cathode reactant and for coolant to flow therethrough.

3. A method as claimed in claim 1, wherein said number of first groups and said number of second groups are less than 10.

4. A method as claimed in claim 1, wherein said number of first groups and said number of second groups are from 3 to 5.

5. A method as claimed in claim 1, wherein said selecting a number of first groups and of cells in each of said first groups, and said selecting a number of second groups and of cells in each of said second groups each comprise selecting according to the following formula:

$$\lambda_n = \frac{\lambda N - \sum_{i=1}^{N_{n-1}} N_i}{N_n},$$

wherein n is a total number of said first groups and of said second groups, respectively, N is a total number of said cells in said stack, and λ is an overall stoichiometry of said anode reactant and said cathode reactant, respectively.

6. A method as claimed in claim 1, wherein said substantially constant cathode reactant stoichiometry is at least 3.0.

7. A method as claimed in claim 6, wherein an overall stoichiometry of said fuel cell stack is below 2.0.

8. A method as claimed in claim 1, wherein said anode reactant is a reformate and said cathode reactant is air.

* * * * *